(12) United States Patent
Krzanowski et al.

(10) Patent No.: US 9,100,299 B2
(45) Date of Patent: Aug. 4, 2015

(54) DETECTING ERROR CONDITIONS IN STANDBY LINKS

(75) Inventors: Roman Krzanowski, White Plains, NY (US); Frank M. Shannon, Arnold, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 349 days.

(21) Appl. No.: 13/476,272

(22) Filed: May 21, 2012

(65) Prior Publication Data

US 2013/0308471 A1 Nov. 21, 2013

(51) Int. Cl.
*H04L 12/26* (2006.01)
*H04L 12/24* (2006.01)

(52) U.S. Cl.
CPC ............ *H04L 43/0811* (2013.01); *H04L 43/50* (2013.01); *H04L 41/06* (2013.01); *H04L 43/10* (2013.01)

(58) Field of Classification Search
CPC ....... H04L 45/28; H04L 45/22; H04L 45/245; H04L 43/50; H04W 24/00
USPC ......... 370/216, 225, 226, 227, 228, 241, 242, 370/248, 252
See application file for complete search history.

(56) References Cited

U.S. PATENT DOCUMENTS

| | | | |
|---|---|---|---|
| 8,036,132 B1 * | 10/2011 | Beattie et al. ................. | 370/242 |
| 8,213,300 B1 * | 7/2012 | Osswald et al. ............... | 370/218 |
| 2007/0047578 A1 * | 3/2007 | Abe et al. ...................... | 370/468 |
| 2008/0089235 A1 * | 4/2008 | Kotrla et al. .................. | 370/242 |
| 2009/0310508 A1 * | 12/2009 | Ou et al. ....................... | 370/253 |
| 2010/0195489 A1 * | 8/2010 | Zhou et al. .................... | 370/216 |
| 2010/0271958 A1 * | 10/2010 | Dillon et al. .................. | 370/242 |

* cited by examiner

*Primary Examiner* — Obaidul Huq

(57) ABSTRACT

A method includes generating, by a first network device, test traffic to be transmitted to a second network device. The first and second network devices are coupled via a number of communication links, where one of links is a backup link. The method also includes transmitting, by the first network device, the test traffic to the second network device at periodic intervals via the backup link, receiving, by the second network device, the test traffic and monitoring the received test traffic. The method further includes comparing the monitored test traffic to a threshold, determining whether the monitored test traffic meets the threshold, and generating an alarm or notification message, in response to determining that the monitored test traffic does not meet the threshold.

24 Claims, 7 Drawing Sheets

DETECTING ERROR CONDITIONS IN STANDBY LINKS

BACKGROUND INFORMATION

Redundant communication systems often include routing devices that are interconnected by more than one communication link. For example, one routing device may be connected to a second routing device by a first link that acts as the primary or active link and a second link that acts as the backup or standby link. When the primary link fails, traffic is typically re-routed via the backup link.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to monitoring a backup or standby link in a communication system. In one exemplary implementation, a network device may transmit test messages or packets to another network device at periodic intervals via the backup link. The test messages may be transmitted at a sufficient frequency to allow a service provider associated with the communication link to determine whether the backup link is performing adequately in the event that customer traffic is to be routed via the backup link. In addition, the test messages may also be relatively large in size to allow the service provider to identify various parameters and/or detect problems that may exist in the backup link.

Figure 1:
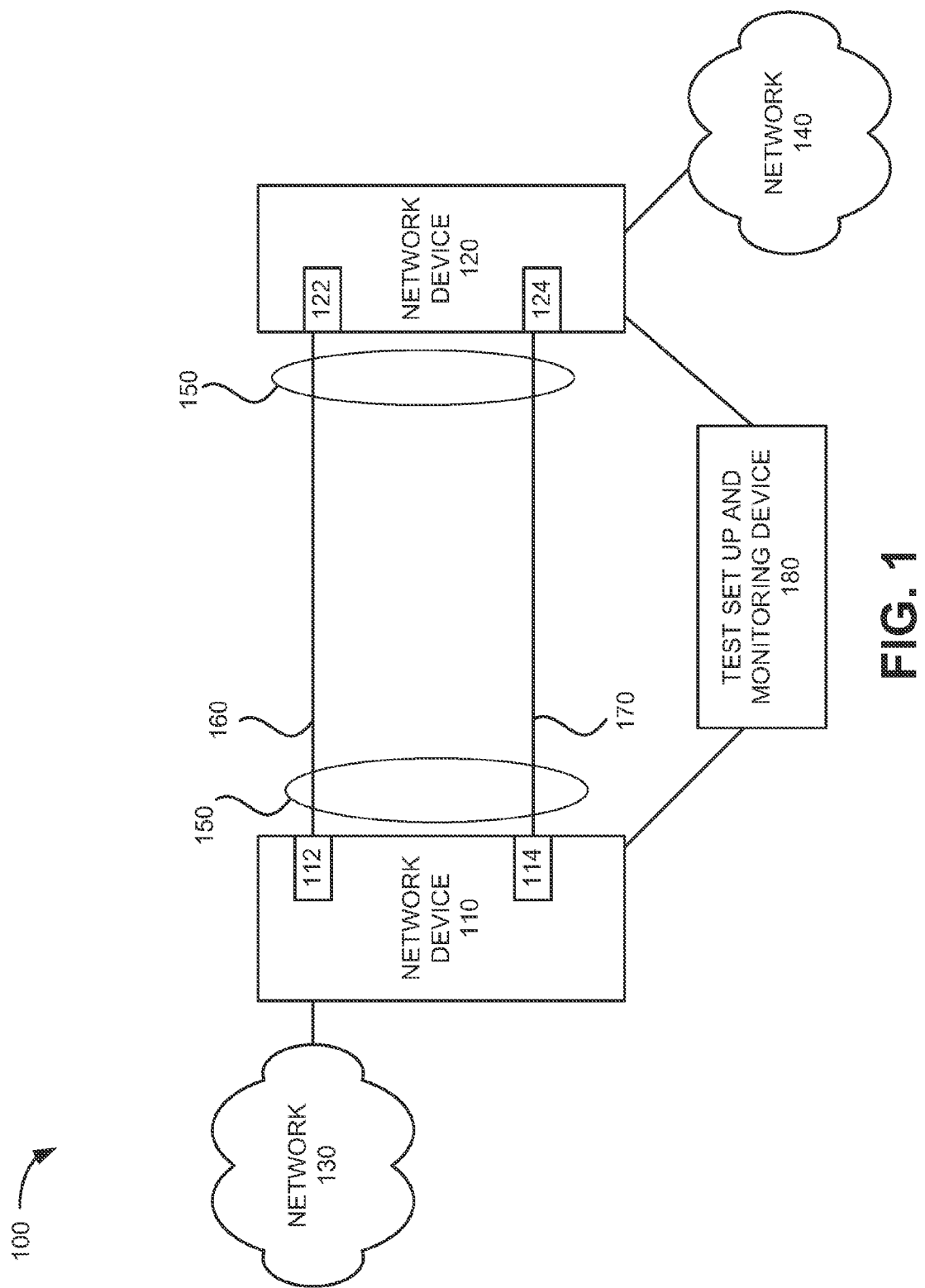
FIG. 1 illustrates an exemplary network in which systems and methods described herein may be implemented.

FIG. 1 is a block diagram of an exemplary network 100 in which systems and methods described herein may be implemented. Network 100 may include network devices 110 and 120, networks 130 and 140, links 160 and 170 and test set up and monitoring device 180.

Network device 110 may represent a switch, such as a layer 2 switch, a router, or another network device that is used to transmit or forward data to other devices in network 100. In one implementation, network device 110 may represent an external network to network interface (ENNI). For example, network device 110 may represent the interface between network 130 and devices external to network 130. Network device 110 may include edge ports 112 and 114 used to forward and receive data from other devices in network 100 via links 160 and 170. Only two edge ports are shown on network device 110 for simplicity. It should be understood that network device 110 may include additional ports (e.g., edge ports) for receiving and transmitting data.

Network device 120 may represent a switch, such as a layer 2 switch, a router, or another network device used to transmit or forward data to other devices in network 100, such as network device 110. Network device 120 may include edge ports 122 and 124 used to forward and receive data from other devices in network 100 via links 160 and 170. In an exemplary implementation, network device 120 may be coupled to network device 110 via a link aggregation group (LAG). For example, referring to FIG. 1, network device 110 may be coupled to network device 120 via LAG 150, which includes links 160 and 170. Link aggregation is a mechanism used to route data between end points using multiple network links and/or ports. For example, a LAG may include two or more physical links connecting two end point devices. In a LAG, the physical links are configured to act as a single logical connection between the end point devices. Monitoring LAGs may allow a service provider to ensure that the LAGs are operating properly.

Network 130 may represent a local area network (LAN), a wide area network (WAN), an intranet, the Internet, a wireless network, and/or another type of network capable of transmitting data. In one implementation, network 130 may include a switched Ethernet system/network (SES). Alternatively, network 130 may represent any network in which data is transmitted from customer sites to other devices in network 100.

Network 140 may represent may represent a LAN, a WAN, an intranet, the Internet, a wireless network, and/or another type of network capable of transmitting data. In one implementation, network 140 may include an SES. Alternatively, network 140 may represent any network in which data is transmitted from customer sites to other devices in network 100.

Links 160 and 170 may include wired, wireless and/or optical transmission media coupling network devices 110 and 120. As described above, in one implementation, links 160 and 170 may be part of LAG 150. A LAG, as discussed briefly above, includes two or more links that are configured to act as a single logical connection between the end point devices. Therefore, in this implementation, LAG 150 includes links 160 and 170 that are configured to act as a single logical connection for routing data between network devices 110 and 120.

Test set up and monitoring device 180 may include a computing device, workstation, etc., via which network personnel associated with monitoring network 100 may set up test parameters associated with testing a backup link in network 100. Test set up and monitoring device 180 may also receive alarm indications and/or test results associated with testing in network 100, as described in detail below.

The network configuration illustrated in FIG. 1 is provided for simplicity. It should be understood that a typical network 100 may include more or fewer network devices, and links. For example, LAG 150 may include more than two links. Network 100 may also include additional elements, such as network interface devices (NIDs), gateways, routers, monitoring systems, etc., that aid in routing traffic and monitoring connections between network devices 110 and 120.

Figure 2:
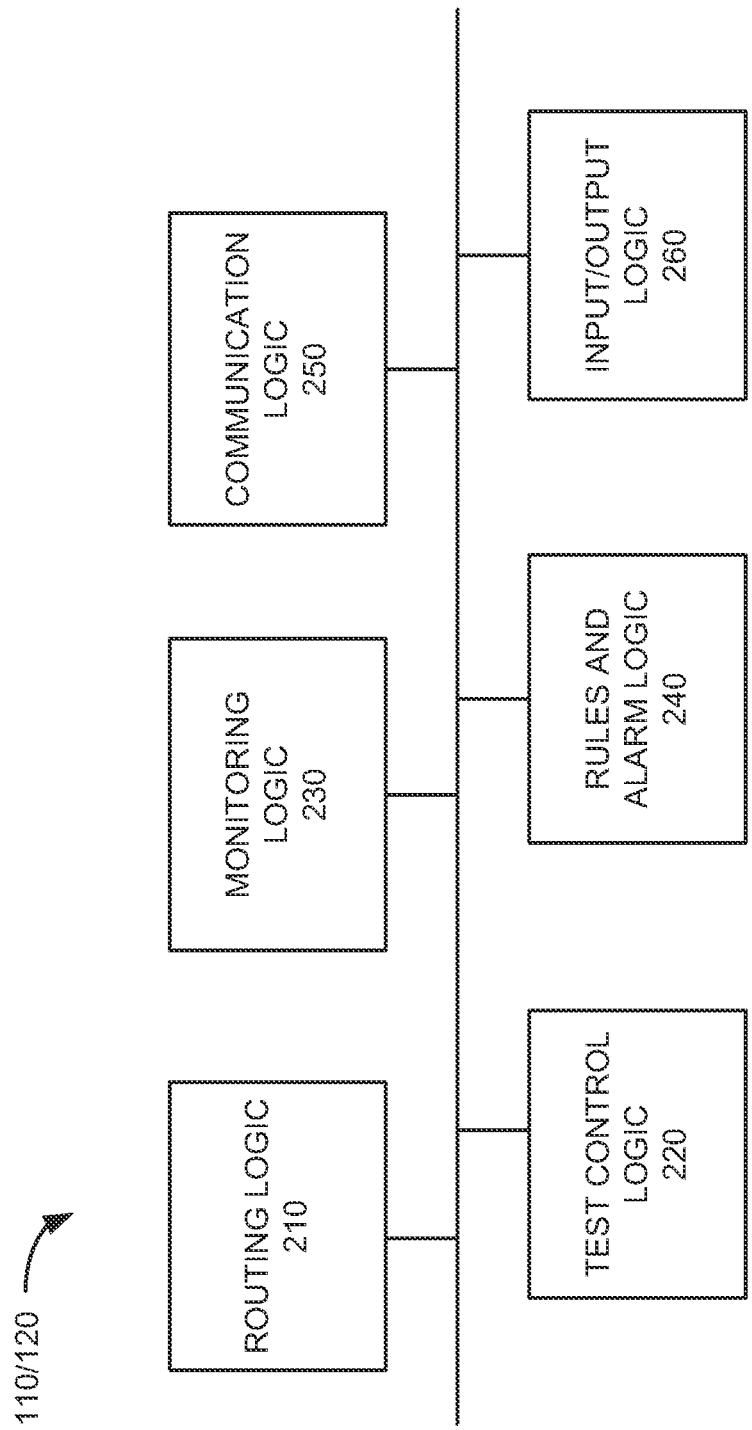
FIG. 2 illustrates an exemplary configuration of logic components implemented in one or more of the network devices of FIG. 1.

FIG. 2 illustrates an exemplary configuration of network device 110. Network device 1210 may be configured in a similar manner. Referring to FIG. 2, network device 110 may include routing logic 210, test control logic 220, monitoring logic 230, rules and alarm logic 240, communication logic 250 and input/output logic 260. The exemplary configuration illustrated in FIG. 2 is provided for simplicity. It should be understood that network devices 110 and 120 may include more or fewer logic devices than illustrated in FIG. 2.

Routing logic 210 may include logic for routing data between end point devices. For example, routing logic 210 may identify forwarding information for routing data frames or packets between network devices 110 and 120 via LAG 150.

Test control logic 220 may include logic for generating test traffic for transmitting between network device 110 and 120. For example, test control logic 220 at network device 110 may generate data frames or packets of a certain size for transmitting to network device 120 at predetermined intervals. Test control logic 220 at network device 110 may also communicate with test control logic 220 at network device 120 to ensure that each end point is aware of the protocol associated with the testing, as well as the size of test messages and the frequency at which the test messages will be transmitted between network devices 110 and 120, as described in more detail below.

Monitoring logic 230 may monitor test traffic transmitted between network devices 110 and 120. For example, monitoring logic 230 at network device 120 may identify the size of a received test packet, determine whether the received test packet contains errors, and perform other test related functions.

Rules and alarm logic 240 may store rules associated with determining whether a communication link is operating properly. For example, in one implementation, rules and alarm logic 240 may store rules indicating minimum requirements/thresholds associated with an adequately performing link. Monitoring logic 230 may access these rules to determine if link 170 is performing adequately to transmit customer data if primary link 160 fails, as opposed to just determining whether link 170 is operational/up, as described in more detail below. Rules and alarm logic 240 may also store rules associated with determining whether an alarm should be generated. For example, rules and alarm logic 240 may receive information from monitoring logic 230 regarding test traffic transmitted on one of links 160 or 170. Based on the test results, rules and alarm logic 240 may determine whether an alarm should be generated to notify personnel associated with monitoring network 100 of a potential problem. As another example, in some instances, rules and alarm logic 240 may automatically signal various automated systems that will modify network configurations based on the alarm/notification.

In an exemplary implementation, rules stored in rules and alarm logic 240 may be provided to network device 110 by network personnel associated with monitoring performance of network 100. For example, network personnel may enter the rules into network device 110 via test set up and monitoring device 180, which forwards the rules to network device 110 and/or network device 120 for storage in rules and alarm logic 240. In each case, rules stored in rules and alarm logic 240 may be designed to aid in ensuring that a backup or standby link is in conformance with performance parameters (e.g., customer-related parameters, service provider related parameters, etc.) associated with routing traffic in network 100.

Communication logic 250 may include logic that allows network device 110 to communicate with other devices, such as network device 120. For example, referring to FIG. 1, communication logic 250 may allow network devices 110 and 120 to communicate with each other in a peer-to-peer fashion via links 160 and 170. In an exemplary implementation, communication logic 250 may forward LAG synchronization information or other control information between network devices 110 and 120 to ensure that network devices 110 and 120 are synchronized and are aware of which link(s) in LAG 150 is configured as a primary link and which link(s) in LAG 150 is configured as a backup link. For example, in one implementation, link 160 may be configured as the active link in LAG 150 to transmit customer traffic and link 170 may be configured as a standby link.

Input/output logic 260 may include logic for receiving and outputting data via network devices 110/120. For example, input/output logic 260 of network device 110 may route data to ports 112 and 114 for transmission to network device 120. Input/output logic 260 may also receive data at ports 112 and 114 transmitted from ports 122 and 124 of network device 120.

In an exemplary implementation, routing logic 210, test control logic 220, monitoring logic 230, rules and alarm logic 240, communication logic 250 and input/output logic 260 may include one or more processors, microprocessors or other processing logic used to interpret and execute instructions. In such implementations, routing logic 210, test control logic 220, monitoring logic 230, rules and alarm logic 240, communication logic 250 and input/output logic 260 may include software instructions stored in a computer-readable medium. A computer-readable medium may be defined as one or more non-transitory memory devices. The software instructions may be read into memory from another computer-readable medium or from another device via a communication interface. The software instructions contained in memory may cause the various logic components, such as routing logic 210, test control logic 220, monitoring logic 230, rules and alarm logic 240, communication logic 250 and input/output logic 260, to perform processes that are described below. Alternatively, hardwired circuitry may be used in place of or in combination with software instructions to implement processes consistent with exemplary embodiments. Thus, systems and methods described herein are not limited to any specific combination of hardware circuitry and software.

As described above, in certain situations, a service provider may wish to ensure that a backup or standby link meets certain performance criteria associated with providing services to a customer. The performance criteria may be associated with a quality of service (QoS) guarantee, a service level agreement (SLA), etc., provided to a customer or some other requirement/threshold. As a result, a service provider associated with network 100 may monitor link 160 and/or link 170, as described in detail below.

Figure 3:
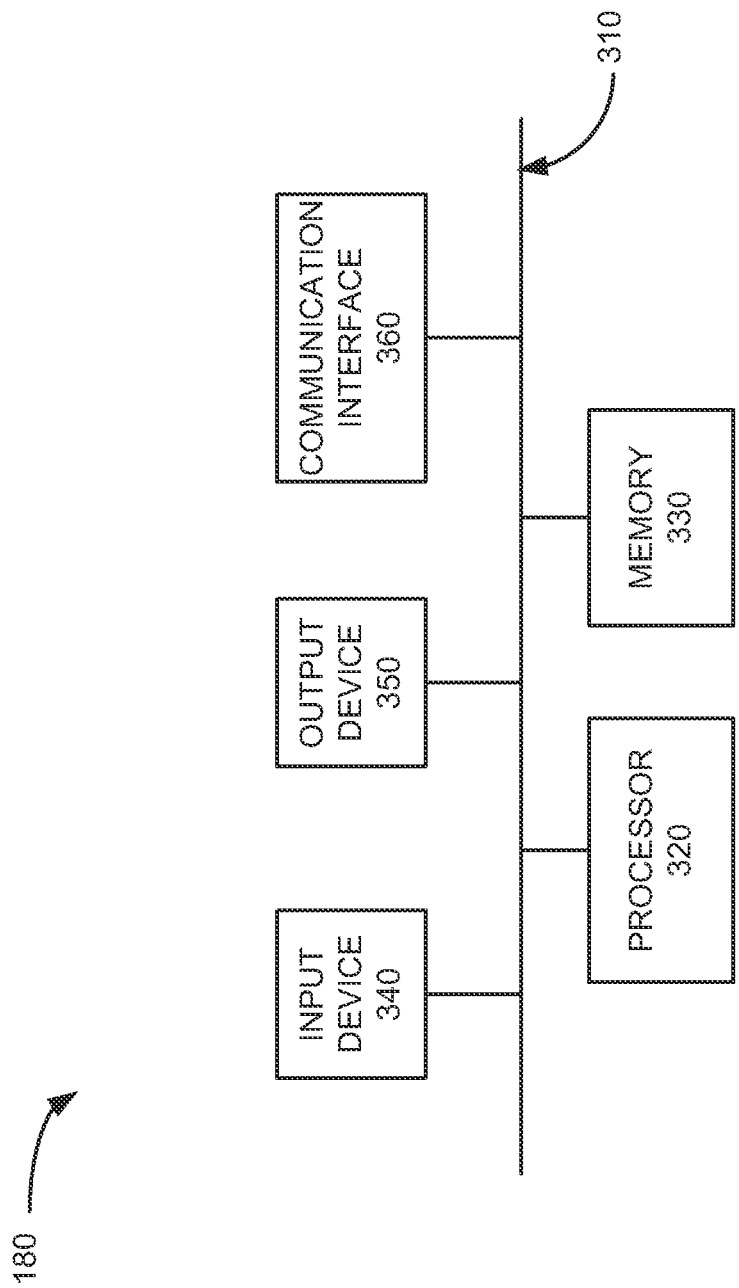
FIG. 3 illustrates an exemplary configuration of logic components implemented in another one of the devices of FIG. 1.

FIG. 3 illustrates an exemplary configuration of test set up and monitoring device 180. Referring to FIG. 3, test set up and monitoring device 180 may include bus 310, processor 320, memory 330, input device 340, output device 350 and communication interface 360. Bus 310 may include a path that permits communication among the elements of test set up and monitoring device 180.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to test set up and monitoring device 180, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD), a printer, a speaker, etc.).

Communication interface 360 may include a transceiver that test set up and monitoring device 180 uses to communicate with other devices (e.g., network devices 110 and 120) via wired, wireless or optical mechanisms. Communication interface 360 may also include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network, such as network 100 or another network.

The exemplary configuration illustrated in FIG. 3 is provided for simplicity. It should be understood that test set up and monitoring device 180 may include more or fewer devices than illustrated in FIG. 2. In an exemplary implementation, test set up and monitoring device 180 may perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
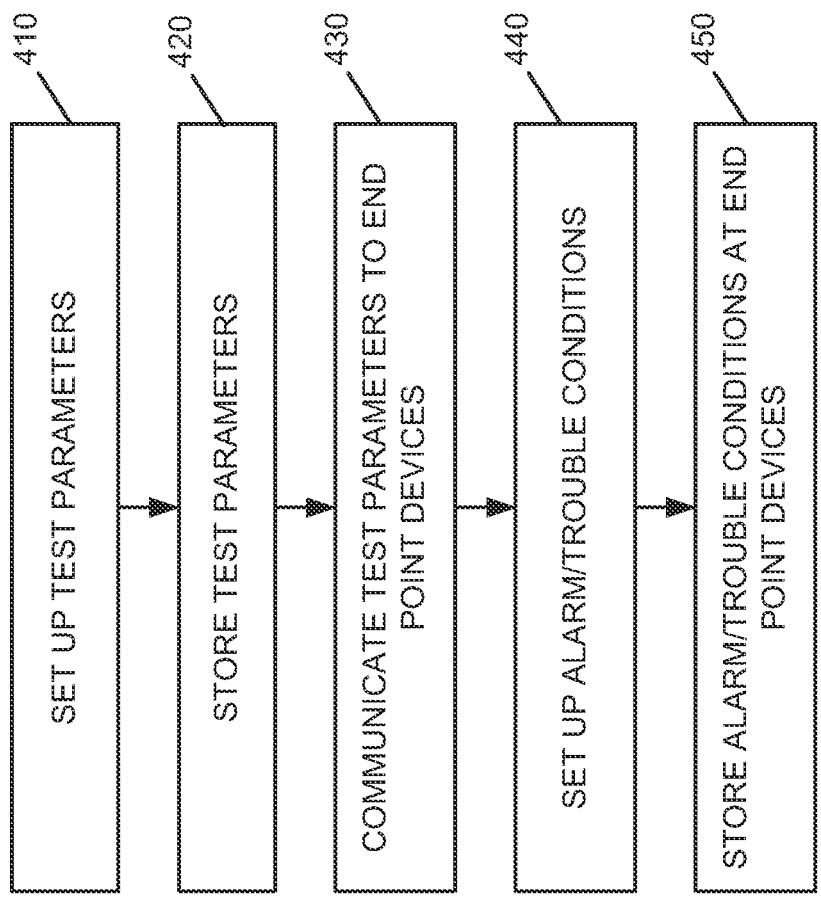
FIG. 4 is a flow diagram illustrating processing associated with configuring the components of FIG. 1 to perform testing in accordance with an exemplary implementation.

FIG. 4 illustrates exemplary processing associated with configuring network devices 110 and 120 to perform link testing. Processing may begin with network personnel associated with monitoring network 100 setting up test parameters (block 410). For example, network personnel at test set up and monitoring device 180 may determine that a backup or standby link in LAG 150 should be tested periodically at a frequency ranging from about every 10 millisecond (ms) to every few hundred milliseconds (e.g., 200 ms, 300 ms, etc.). In other instances, network personnel may determine that the backup link in LAG 150 should be tested at other frequencies, such as less than 10 ms (e.g., five milliseconds) or greater than a few hundred milliseconds (e.g., every second, two seconds, etc). In each case, the frequency of testing may be selected in accordance with performance criteria and/or the importance of data transmitted between network devices 110 and 120. For example, if network devices 110 and 120 are used to transmit important or critical data, the frequency of the testing may be very frequent, such as every 10 milliseconds or less (e.g., every two milliseconds).

Network personnel may also determine the size of a message to be used for the testing. In one implementation, network personnel may set the size of a test message to be at least 1522 bytes (e.g., the size of an Ethernet frame) and less than 9200 bytes (e.g., the size of a jumbo frame). In other instances, the size of the test message may be set to be less than 1522 bytes (e.g., 500 bytes or less) or more than 9200 bytes (e.g., 15,000 bytes or more). Similar to the discussion above regarding the frequency of testing, the size of the test messages used to test link 160 and/or 170 may be selected to allow network personnel to identify the performance characteristics of link 160 and/or 170, such as latency, packet loss, error rate, jitter, etc. In each case, the size of the test messages may be selected in accordance with performance criteria and/or the type of data transmitted between network devices 110 and 120. For example, if network devices 110 and 120 are used to transmit large amounts of data that require a very low error rate, the size of the test messages may be relatively large to allow network personnel to more accurately assess the characteristics of link 160 and/or 170. In addition, sending relatively large test messages and/or sending the test messages at more frequent intervals of time may allow network device 110 and/or 120 to detect problems, such as brief power fluctuations on a link, misalignment of fibers in an optical transmission medium, etc., that could not be detected otherwise.

Network personnel at test set up and monitoring device 180 may then store the test parameters in monitoring device 180 (block 420). For example, network personnel at test set up and monitoring device 180 may store the test parameters in memory 330.

Test set up and monitoring device may then transmit the test parameters to the end point devices involved in the testing (block 430). For example, network personnel may instruct test set up and monitoring device 180 to transmit the test parameters to network devices 110 and 120. In this case, communication interface 360 may transmit the test parameters to communication logic 250 of network devices 110 and 120.

Network personnel may also set up or identify alarm/trouble conditions associated with testing (block 440). For example, network personnel may determine that latency, error rate, packet loss and/or jitter rates, for a communication link, that are above a certain threshold should generate an alarm or notification message that will be transmitted to network personnel, such as network personnel at test set up and monitoring device 180. Network personnel and/or test set up monitoring device 180 may transmit the alarm/trouble conditions threshold information to the end point devices (i.e., network devices 110 and 120 in this example).

Network devices 110 and 120 may receive the alarm/trouble information and store the information in rules and alarm logic 240 (block 450). For example, communication logic 250 of each of network devices 110 and 120 may receive the alarm threshold information and store the information in their respective rules and alarm logic 240. The alarm threshold information may be used when network 100 is undergoing testing, as described in detail below.

Figure 5:
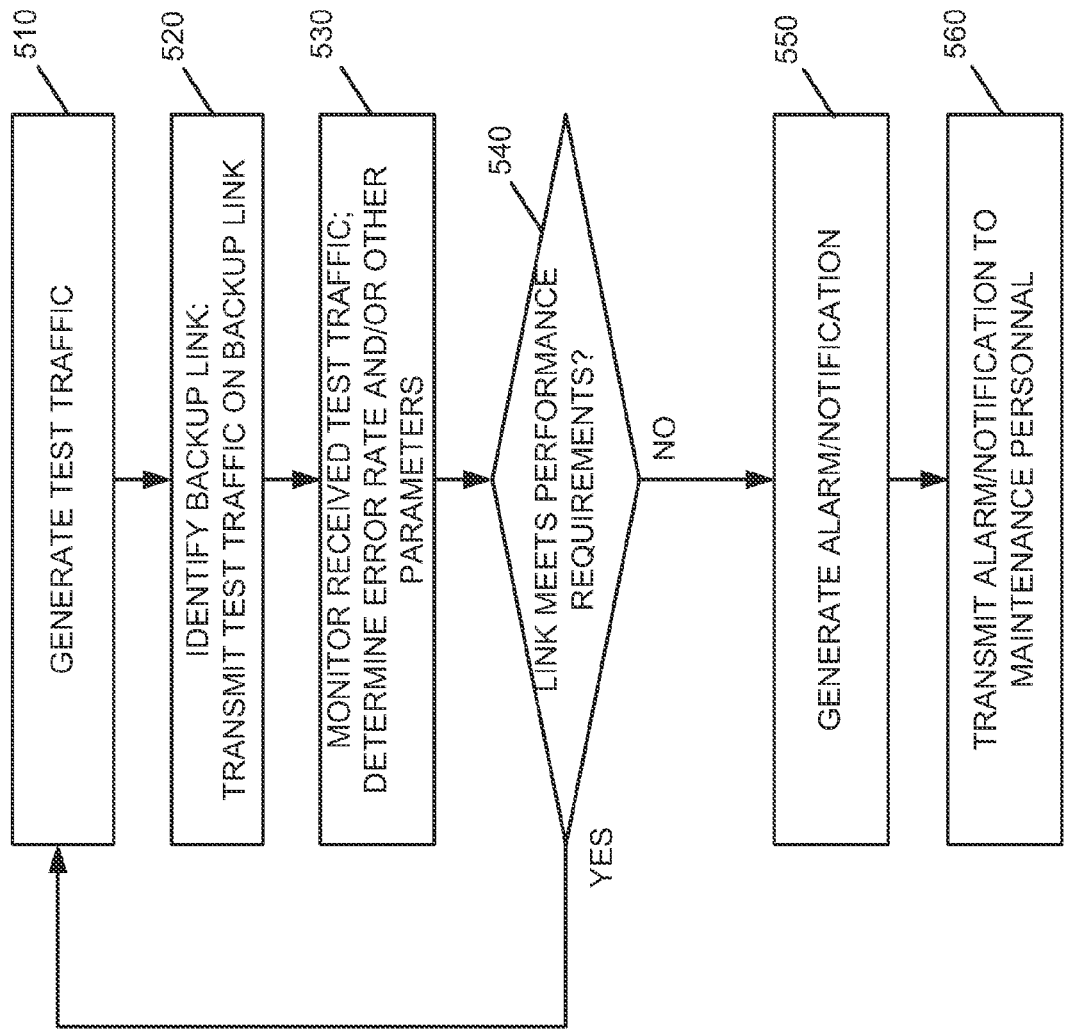
FIG. 5 is a flow diagram illustrating processing associated with testing in the network of FIG. 1 in accordance with an exemplary implementation.

FIG. 5 illustrates exemplary processing associated with testing a standby link in network 100. Processing may begin with test control logic 220 generating test traffic (block 510). In an exemplary implementation, test control logic 220 may generate test traffic in accordance with information stored in rules and alarm logic 240. For example, rules and alarm logic 240 may store information indicating the size of test messages to be transmitted and the frequency of transmission.

In this example, assume that rules and alarm logic 240 stores information indicating that the test messages should have a size ranging from 1522 bytes to 9200 bytes. In this instance and in accordance with one implementation, the test messages may be generated randomly to any size within the range of 1522 bytes to 9200 bytes. In other instances, rules and alarm logic 240 may store information indicating that each test message should be a certain size or at least a certain size.

In this example, assume that test control logic 220 generates a 5000 byte test message and that rules and alarm logic 240 indicates that the test message is to be transmitted every 20 milliseconds. Further assume that link 170 of LAG is configured as a backup or standby link that is not being used to transmit customer data. In this case, test control logic 220 identifies link 170 as the standby link (block 520). Test control logic 220 may transmit the test traffic on link 170 (block 520). In one implementation, the test traffic may be transmitted by network device 110 (or network device 120) as part of a link aggregation control protocol (LACP) message. For example, an LACP message may be transmitted at various intervals between network devices 110 and 120 to communicate protocol and other information regarding the configuration/set up of LAG 150. In this implementation, the test traffic may be transmitted as part of the LACP message.

In each case, network device 120 receives the test traffic. Monitoring logic 230 of network device 120 may monitor the received test traffic for errors or other problems (block 530). For example, monitoring logic 230 may determine an error rate associated with the test traffic (block 530). That is, monitoring logic 230 may store information regarding the test message based on information provided by test set up and monitoring device 180 and/or signaling information provided by network device 110 prior to initiating testing of link 170. In either case, monitoring logic 230 may determine an error rate associated with the received packet by comparing the received test data with the test data that was transmitted.

Monitoring logic 230 may also calculate latency, packet loss and jitter values based on the received test traffic (block 530). For example, the test traffic may include time tag/stamp information indicating when the test data was transmitted from network device 110. In this case, based on the time that the test traffic was received, monitoring logic 230 may determine latency associated with link 170. Monitoring logic 230 may also determine packet loss by, for example, comparing information in the received test traffic with information indicating the number of packets included in the transmitted test traffic. Monitoring logic 230 may also determine a jitter value by comparing variations in latency associated with received packets. In each case, monitoring logic 230 may calculate the desired performance characteristics associated with link 170.

Monitoring logic 230 may also access rules and alarm logic 240 and determine whether the link meets the threshold performance requirements (block 540). For example, rules and monitoring logic 240 may store threshold performance criteria associated with a customer or other entity using links 160 and 170 to transmit traffic. The threshold performance criteria may correspond to a QoS or SLA guarantee provided to the customer. In other instances, the threshold performance parameters may correspond to other customer or service provider related criteria.

If the measured performance data associated with the data received on link 170 meets the threshold criteria (block 540—yes), network device 110 may continue to transmit test traffic to network device 120 at the predetermined frequency (i.e., every 20 milliseconds in this example) and monitoring logic 230 may continue to monitor the received test traffic.

If, however, the link does not meet the threshold performance criteria (block 540—no), monitoring logic 230 may generate an alarm or notification (block 550). For example, monitoring logic 230 may generate a message to send to test set up and monitoring device 180 indicating that link 170 in not in compliance with one or more performance requirements. In one implementation, the message may identify the particular problem/error condition with link 170, such as link 170 has exceeded the required error rate, packet loss, jitter and/or latency threshold. For example, the notification message may indicate that link 170 has lost/dropped five packets in the last test transmission or in the last X transmissions (where X may be an integer), has received 12 error packets in the last X transmissions, such as runt or short packets, has a latency of Y milliseconds, etc. Communication logic 250 may transmit the alarm/notification to network personnel associated with monitoring and maintaining network 100 (block 560).

In one implementation, network personnel at test set up and monitoring device 180 may receive the notification/alarm message and determine whether any actions need to be taken. For example, network personnel may send maintenance personnel to perform further testing on link 170. In other instances, network personnel and/or test set up and monitoring device 180 may automatically signal network devices 110 and 120 to deactivate link 170 as a possible backup link until the problem is resolved, and/or designate another one of the links as a backup link. In this manner, network personnel may be aware of a problem in a backup link prior to actually routing customer traffic on that particular link. This may allow a service provider to avoid routing data on a problematic link when a failure or other problem in the primary/active link (i.e., link 160 in this example) occurs.

Figure 6:
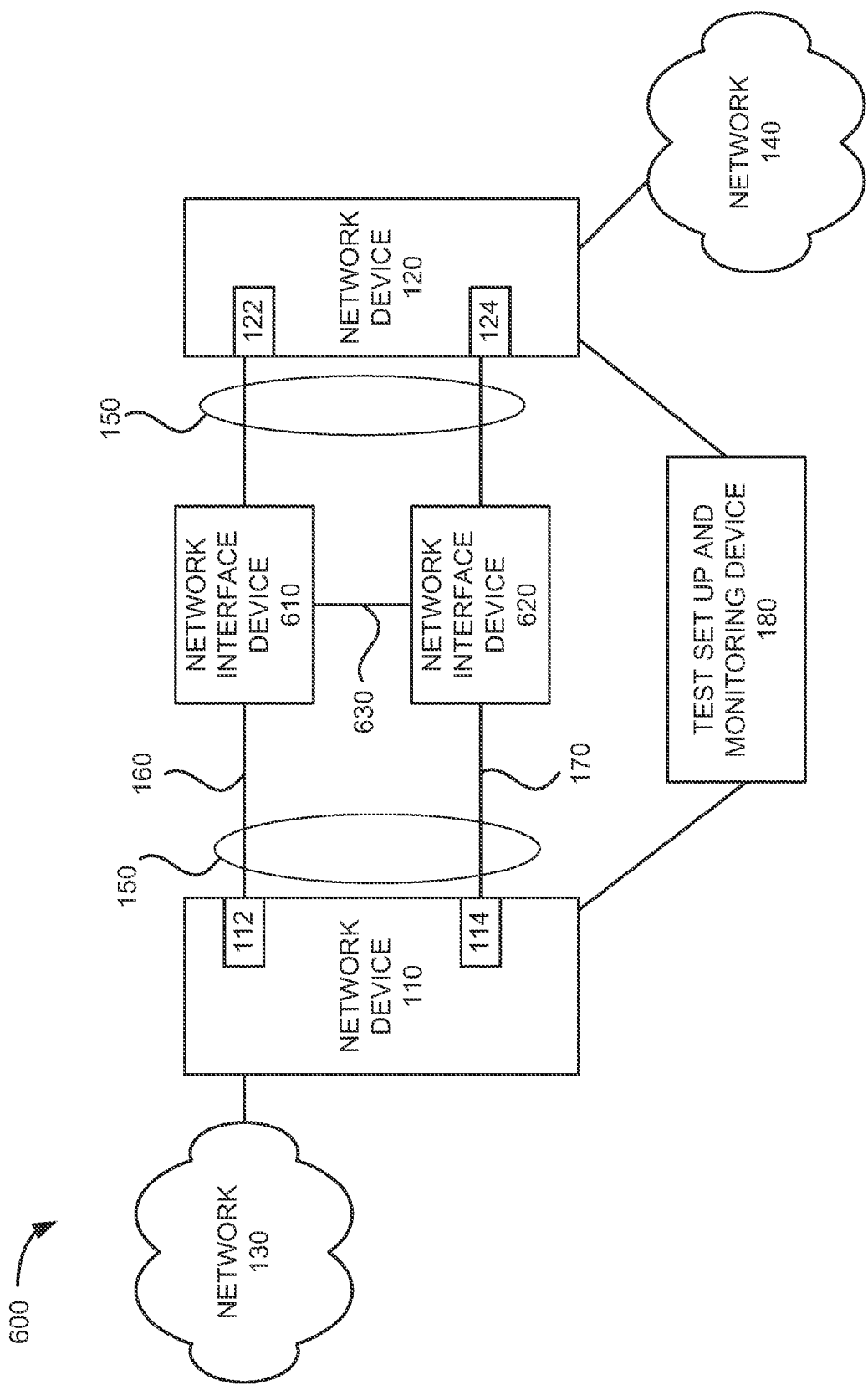
FIG. 6 illustrates another exemplary network in which systems and methods described herein may be implemented.

As discussed above, in some implementations, network 100 may include additional devices. For example, network 600 illustrated in FIG. 6 may include network interface device (NID) 610 and NID 620, in addition to network devices 110 and 120, links 160 and 170 and networks 130 and 140. Referring to FIG. 6, NIDs 610 and 620 may each represent an interface device that monitors traffic flowing between various networks/network devices. For example, NIDs 150 and 160 may each be positioned as a "bump-in-the-wire" between network devices 110 and 120. In an exemplary implementation, NIDs 610 and 620 may monitor or police traffic for QoS or SLA purposes and for various testing purposes, etc., as described in detail below. In an exemplary implementation, NIDs 610 and 620 may be configured in a manner similar to test set up and monitoring device 180 described above with respect to FIG. 3 and may include logic components similar to those in network devices 110 and 120 described above with respect to FIG. 2.

Figure 7:
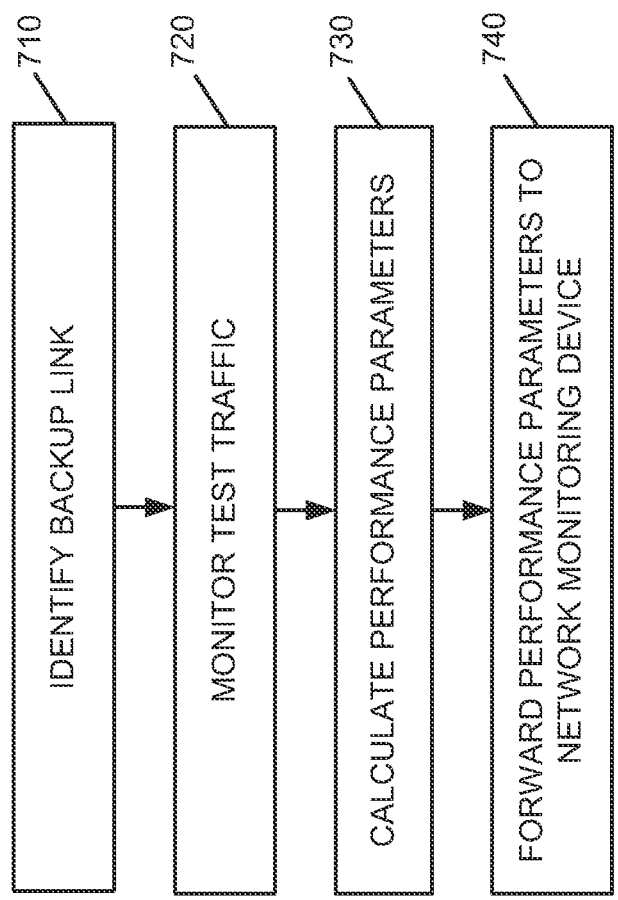
FIG. 7 is a flow diagram illustrating processing associated with monitoring traffic in accordance with an exemplary implementation.

FIG. 7 illustrates exemplary processing associated with monitoring test traffic in network 600. Processing may begin with NIDs 610 and 620 determining which link in LAG 150 is the backup or standby link (block 710). For example, NIDs 610 may communicate with network devices 110 and/or 120 to identify the backup link in LAG 150.

In this case, assume that link 170 is the backup link. NID 620 may then monitor the test traffic transmitted by network device 110 or network device 120 on link 170 in manner similar to that described above with respect to the monitoring described above with respect FIG. 5 (block 720). For example, NID 620 may receive and/or intercept the test data transmitted on link 170. NID 620 may also determine the performance parameters associated with link 170 (block 730). For example, NID 620 may calculate an error rate, packet loss, latency and/or jitter for link 170 in a manner similar to that described above with respect to FIG. 5.

If a problem is detected, such as link 170 does not meet one or more thresholds/criteria stored in rules and alarm logic 240 of NID 620, NID 620 may transmit a notification message to test set up and monitoring device 180, in a similar manner to that described in FIG. 5 with respect to network devices 110 and 120. In addition, NID 620 may transmit the test related performance information to NID 610 via connection 630. This may allow NIDs 610 and 620 to communicate information regarding the status of the links in LAG 150. In each case, test set up and monitoring device 180 may receive the notification message and determine whether to take action, such as send network personnel to monitor the link, signal network devices 110 and 120 to deactivate the backup link, automatically reconfigure LAG 150 with a new backup link, etc.

Implementations described herein provide for monitoring a backup link in a communication system. In one implementation, network personnel may set the test data to have a particular size and to be transmitted at particular intervals to allow a service provider to ensure that the backup link is in conformance with certain requirements. This may allow the service provider to make changes to the network if the backup link does not meet the requirements prior to using the backup link to transmit customer data.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, network devices 110 and 120 connected via links of a LAG. In other implementations, network devices 110 and 120 may be connected via one or more primary links and one or more backup links that are not part of a LAG.

In addition, implementations have been described above with respect to transmitting test traffic on a backup link. In other implementations, test traffic may also be transmitted on an active link. For example, network device 110 may detect an inactive period on one of the active links and transmit test data on the active link. Network device 120 may receive the test traffic and identify whether the active link meets the threshold requirements. This may allow the service provider to ensure that the active link is not experiencing any problems.

Further, implementations have been described above with respect to a LAG that is illustrated as including two links. However, as described above, it should be understood that in other implementations, a LAG (or other group of connections between network devices) may include more than two links that connect the end point devices (e.g., network devices 110 and 120). For example, a LAG or other group of communication links connecting network devices 110 and 120 may include four links, with three of the links being active and one of the links being a standby link. In each case, the backup link may be tested to ensure that it meets certain requirements.

In addition, in one of the implementations described above, NIDs 610 and/or 620 were described as monitoring the backup link, as opposed to network devices 110 and/or 120 monitoring the backup link. In other implementations, NIDs 610 and 620 may perform monitoring of a backup link in addition to the monitoring performed by network devices 110 and/120. In such a scenario, NIDs 610 and 620 may supplement the testing performed by network devices 110 and/or 120. For example, NIDs 610 and/or 620 may perform some of the testing of the backup link, while the end point devices (i.e., network devices 110 and 120) may perform other portions of the testing.

Still further, while series of acts have been described with respect to FIGS. 4, 5 and 7, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:

generating, by a first network device, test traffic, wherein the first network device is coupled to a second network device via a plurality of communication links and wherein at least one of the plurality of links is a backup link that is not configured to carry customer traffic when other ones of the plurality of communication links are active;

transmitting, by the first network device, the test traffic to the second network device at periodic intervals via the backup link to determine whether the backup link is operating in conformance with performance parameters associated with routing customer traffic;

receiving, by the second network device, the test traffic;

monitoring the received test traffic;

comparing the monitored test traffic to at least one performance parameter associated with routing customer traffic;

determining whether the monitored test traffic meets the at least one performance parameter;

generating an alarm or notification message, in response to determining that the monitored test traffic does not meet the at least one performance parameter; and transmitting the alarm or notification message to a monitoring device located externally with respect to the first and second network devices.

2. The method of claim 1, wherein the alarm or notification message identifies a particular problem with the backup link.

3. The method of claim 1, wherein the generating test traffic comprises generating a test message having a size ranging from greater than 1522 bytes to 9200 bytes.

4. The method of claim 1, wherein the transmitting the test traffic at periodic intervals comprises transmitting the test traffic at an interval ranging from every 10 milliseconds to every 200 milliseconds.

5. The method of claim 1, wherein the plurality of communication links comprises a link aggregation group (LAG), the method further comprising:

identifying, by the first network device, the backup link in the LAG.

6. The method of claim 5, further comprising:
identifying an active link in the LAG;
determining, by the first network device, that no traffic is being transmitted on the active link; and
transmitting the test traffic via the active link.

7. The method of claim 1, wherein the at least one performance parameter comprises at least two of a latency threshold, a jitter threshold, an error rate threshold or a packet loss threshold.

8. The method of claim 7, wherein the at least one performance parameter comprises the latency threshold and the jitter threshold.

9. The method of claim 1, further comprising:
identifying another one of the plurality of links as the backup link, in response to determining that the monitored test traffic does not meet the at least one performance parameter.

10. The method of claim 1, wherein the first and second network devices are coupled to network interface devices, and wherein the method further comprises:
monitoring, by at least one of the network interface devices, the test traffic.

11. The method of claim 1, wherein the plurality of communication links comprise a link aggregation group (LAG), the method further comprising:
automatically reconfiguring the LAG in response to the alarm or notification message, wherein the automatically reconfiguring comprises:
signaling at least one of the first or second network devices to deactivate the backup link and select another one of the plurality of communication links as the backup link.

12. A device, comprising:
a plurality of ports configured to transmit and receive data over a plurality of communication links, wherein at least one of the links is a backup link that is not configured to carry customer traffic when other ones of the plurality of communication links are active; and
at least one processor configured to:
receive, via one of the plurality of ports, test traffic at periodic intervals transmitted by a second device via the backup link to determine whether the backup link is operating in conformance with performance parameters associated with routing customer traffic,
monitor the received test traffic,
compare the monitored test traffic to at least one performance parameter associated with routing customer traffic,
determine whether the monitored test traffic meets the at least one performance parameter,
generate a notification message in response to determining that the monitored test traffic does not meet the at least one performance parameter, and
transmit the notification message to a monitoring device located externally with respect to the device.

13. The device of claim 12,
wherein the notification message identifies a particular problem with the backup link.

14. The device of claim 12, wherein when receiving test traffic, the at least one processor is configured to receive test messages having a size ranging from greater than 1522 bytes to 9200 bytes.

15. The device of claim 12, wherein when receiving test traffic, the at least one processor is configured to receive the test traffic at periodic intervals ranging from every 10 milliseconds to every 200 milliseconds.

16. The device of claim 12, wherein when comparing the monitored test traffic to at least one performance parameter, the at least one processor is configured to:
compare the monitored test traffic to at least one of a latency threshold, a jitter threshold, an error rate threshold or a packet loss threshold.

17. The device of claim 16, wherein when comparing the monitored test traffic, the at least one processor is configured to compare the monitored test traffic to at least one of the latency threshold or the jitter threshold.

18. The device of claim 12, wherein the at least one processor is further configured to:
identifying another one of the plurality of communication links as the backup link, in response to determining that the monitored test traffic does not meet the at least one performance parameter.

19. A system, comprising:
a first network device; and
a second network device coupled to the second network device via a plurality of links, wherein the links comprise a link aggregation group (LAG) and at least one of the links in the LAG functions as a backup link that is not configured to carry customer traffic when other ones of the plurality links in the LAG are active,
wherein the second network device is configured to:
transmit test traffic to the second network device at periodic intervals via the backup link to determine whether the backup link is operating in conformance with performance parameters associated with routing customer traffic, and
wherein the first network device is configured to:
receive the test traffic,
determine whether the received test traffic meets at least one performance parameter,
generate a notification message, in response to determining that the received test traffic does not meet the at least one threshold, and
transmit the notification message to a monitoring device located externally with respect to the first and second network devices.

20. The system of claim 19, further comprising:
the monitoring device.

21. The system of claim 20, wherein the notification message comprises information identifying a particular problem with the backup link.

22. The system of claim 21, wherein the monitoring device is configured to:
receive the notification message, and
automatically reconfigure the LAG in response to the notification message.

23. The system of claim 22, wherein when automatically reconfiguring the LAG, the monitoring device is configured to:
signal at least one of the first or second network devices to deactivate the backup link and select another one of the plurality of links as the backup link.

24. The system of claim 19, wherein when transmitting the test traffic at periodic intervals, the second network device is configured to transmit a test message having a size ranging from greater than 1522 bytes to 9200 bytes at an interval ranging from every 10 milliseconds to every 200 milliseconds.

* * * * *